US010491578B1

(12) United States Patent
Hebert et al.

(10) Patent No.: US 10,491,578 B1
(45) Date of Patent: Nov. 26, 2019

(54) MITIGATION OF OFFLINE CIPHERTEXT-ONLY ATTACKS

(71) Applicant: SAP SE, Walldorf (DE)

(72) Inventors: Cédric Hebert, Mougins (FR); Laurent Gomez, Pégomas (FR); José Márquez, Nußloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/941,548

(22) Filed: Mar. 30, 2018

(51) Int. Cl.
*H04L 29/06* (2006.01)
*H04L 9/32* (2006.01)
*H04L 9/06* (2006.01)
*H04L 9/16* (2006.01)

(52) U.S. Cl.
CPC .......... *H04L 63/068* (2013.01); *H04L 9/0618* (2013.01); *H04L 9/16* (2013.01); *H04L 9/3236* (2013.01)

(58) Field of Classification Search
CPC ....... H04L 9/0618; H04L 9/3236; H04L 9/16; H04L 9/002; H04L 9/0662; H04L 9/0869; H04L 63/0428; H04L 63/068; H04L 2209/08
See application file for complete search history.

(56) References Cited

U.S. PATENT DOCUMENTS

| | | | | |
|---|---|---|---|---|
| 2005/0201552 | A1* | 9/2005 | Arisawa | G06F 21/75 380/28 |
| 2008/0232591 | A1* | 9/2008 | Jutla | H04L 9/0637 380/277 |
| 2013/0216044 | A1* | 8/2013 | Gentry | H04L 9/008 380/277 |
| 2017/0230189 | A1* | 8/2017 | Toll | G06Q 40/04 |
| 2017/0344988 | A1* | 11/2017 | Cusden | H04L 9/3247 |
| 2018/0144114 | A1* | 5/2018 | Fiske | H04L 9/3239 |

\* cited by examiner

*Primary Examiner* — Chau Le
(74) *Attorney, Agent, or Firm* — Sterne, Kessler, Goldstein & Fox P.L.L.C.

(57) ABSTRACT

Disclosed herein are system, method, and computer program product embodiments for mitigating offline decryption attacks of ciphertext. An embodiment operates by inputting plaintext into an encryptor, writing ciphertext output from the encryptor into memory, inputting the ciphertext from memory into a noise generator, outputting ciphertext from memory to an output device in response to receiving a first timing signal from a timer, and outputting noise data generated by the noise generator to the output device in response to receiving a second timing signal from the timer. The output device may be a node in a distributed ledger, in some embodiments. The distributed ledger may include a blockchain, for example. Using techniques disclosed herein, encryption may be strengthened to thwart attempts by untrusted third-party attackers to crack encryption, e.g., of information that is sensitive and/or confidential, even when they use significant computational resources separate from host computers of legitimate parties.

20 Claims, 5 Drawing Sheets

MITIGATION OF OFFLINE CIPHERTEXT-ONLY ATTACKS

BACKGROUND

In situations where encrypted information (i.e., ciphertext) is permanently available to the public, an attacker motivated to decrypt the ciphertext may have practically unlimited time and resources to attempt decryption offline, without detection. Legitimate interested parties (i.e., creators and intended recipients of ciphertext) thus could not know specifically that the attacker is accessing or trying to decrypt the ciphertext, such as by cryptanalysis or brute force, and take reactive measures to protect against such attacks. Ciphertext on a blockchain is a common situation like this, with ciphertext concealing private transactions.

Although known workarounds exist, such as avoidance of publicly sharing cryptographically verifiable data in a distributed public ledger, other pitfalls abound. Privately maintaining consistent records of transactions, while protecting against data breaches, leaks, forgeries, destruction, tampering, or accidental loss, may incur additional expenses and difficulties, which may be remedied by adoption of blockchain technology.

In order to ensure adoption of technology that would result in private information being permanently and publicly available, potential adopters typically want assurances that information of their private transactions will be reasonably secure despite allowing potential attackers unfettered access to such confidential information, even if only in encrypted form. In these situations, while established good practices such as key rotation, strong algorithms, long keys, etc., should generally be used, these practices alone would not be sufficient to provide reasonable safeguards for sensitive encrypted information that would be publicly available on a permanent public ledger, for example, or in any other persistent public forum, because information may not be removed or altered to use new encryption keys or schemes.

Trends of continued evolution of computing platforms, capable of breaking even strong encryption, generally signify that encryption that is considered strong now will not be strong decades into the future, even if confidentiality will need to be maintained for substantially longer time periods, if not indefinitely. An added level of assurance is therefore needed in order to protect private information and to instill confidence into potential adopters of public platforms, e.g., blockchain-based systems, for private transactions and other sensitive information, in situations where data integrity and confidentiality are highly valued.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for mitigating offline decryption attacks of ciphertext.

For some non-limiting examples referenced in this detailed description, shared ledgers or distributed ledgers, including blockchain technology, may be included as non-limiting use cases. Such blockchains may be, for example, permissionless blockchains, permissioned blockchains (consortium blockchains), or any combination thereof, including hybrid blockchains. Any method(s), function(s), mechanism(s), model(s), or protocol(s) may be used for validating related transactions, identities of parties, etc., to establish consensus. Some examples of consensus validation models may include proof-of-stake, proof-of-space, proof-of-authority, and proof-of-work, including reusable proof-of-work.

Consensus may be determined by distributed consensus, decentralized consensus, or consortium-based consensus, to name a few examples. Any similar form of reliable, fault-tolerant, and consistent validation of data and results across multi-agent systems may be used. In addition to direct validation of consensus, static contracts on a distributed ledger, fully or partially self-executing smart contracts, operationalized contracts, or smart bonds, to name a few non-limiting examples, may also leverage blockchain technology and benefit from enhanced encryption techniques described herein, for confidentiality and for security.

However, encryption techniques described herein may yield benefits with other types of communication and/or data storage, not limited to blockchain or distributed ledger technology only. For example, the encryption techniques described herein may provide some added security even when privately stored secure communications are compromised, such as if secure communications were intercepted in transit (with or without detection of legitimate interested parties) or if stored ciphertext were stolen or otherwise exfiltrated from formerly trusted storage media that have been compromised by an untrusted third party, such as in an isolated data breach, a leak, or in an advanced persistent threat, to name some examples.

Thus, employing encryption techniques described herein may further improve security of encrypted information even if the encrypted information is not intended for public sharing on a public ledger such as a blockchain. Assuming that the information (as ciphertext only) may fall into control of a malicious attacker, ciphertext generated using techniques described herein may significantly impede or completely inhibit the attacker's ability to analyze or brute-force decrypt the ciphertext to get the source plaintext or any encryption keys, regardless of how the ciphertext may have been obtained by the attacker.

Figure 1:
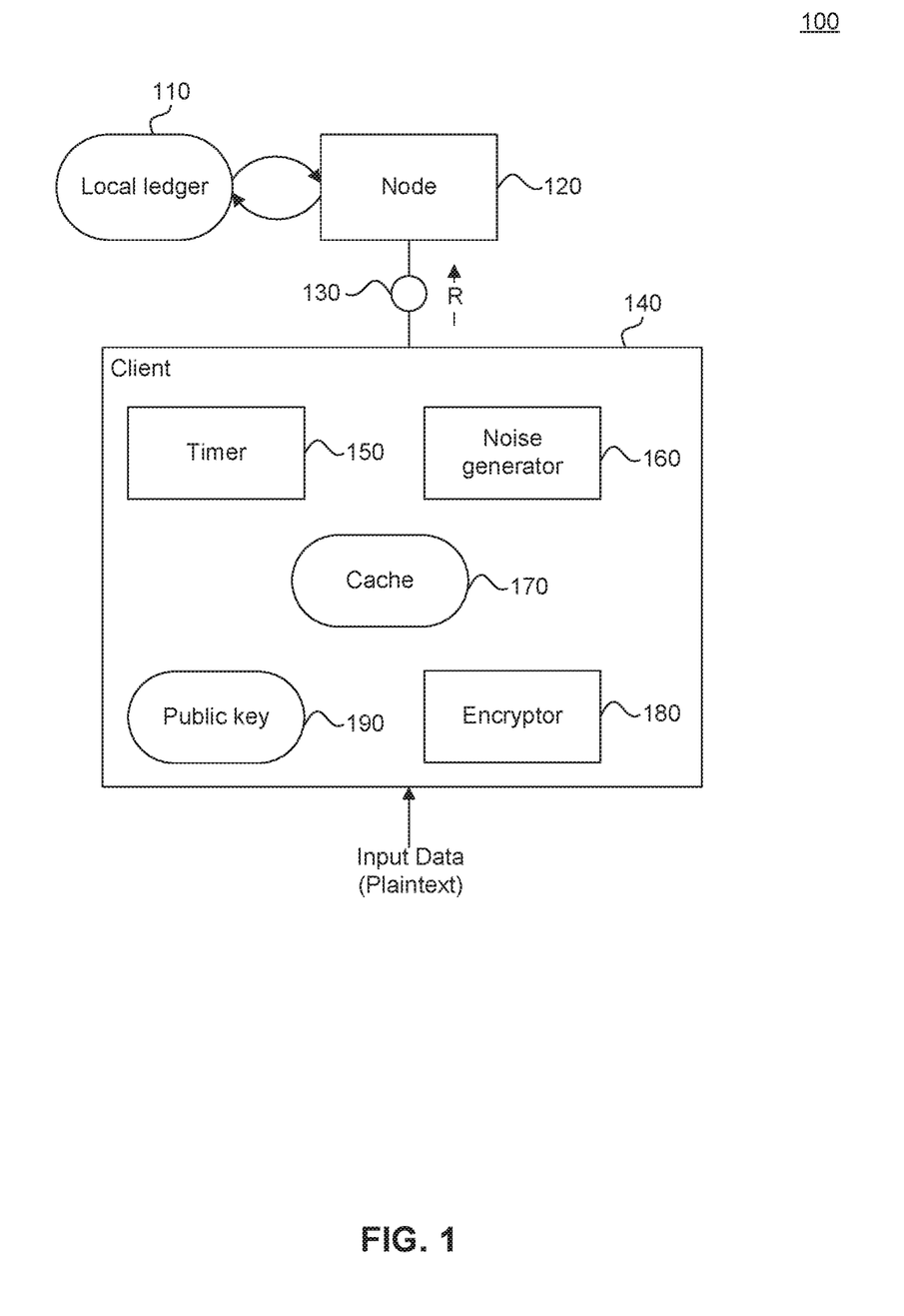
FIG. 1 is a block diagram illustrating a system architecture suitable for implementing certain enhanced encryption techniques, according to some embodiments.

FIG. 1 is a block diagram illustrating a client-based system architecture suitable for implementing certain enhanced encryption techniques, according to some embodiments.

System 100 may include client 140, such as in the embodiment depicted in FIG. 1. Client 140 may include elements such as a timer 150, a noise generator 160, an encryptor 180, or any combination thereof. Client 140 may further include a cache 170, and storage for an encryption key, such as public key 190, on the client 140. Encryption may be performed using public key 190, in some embodiments, or alternatively using a private key, at least part of a consortium key set, or multiple keys in various combinations, to name some non-limiting examples. Encryption algorithms may include symmetric-key algorithms or asymmetric-key algorithms, for example. In some embodiments, encryptor 180 may be configured to implement multiple encryption algorithms and cryptosystems, including use of hybrid cryptosystems, so as to realize such advantages as further safeguarding against adaptive chosen ciphertext attacks, for example.

When client 140 encrypts plaintext input data, client 140 may temporarily store some ciphertext output from encryptor 180 in cache 170 before sending some of the ciphertext output to node 120, such as via a network connection 130. Network connection 130 may, in some embodiments, be instead a local bus or bus infrastructure (such as communication infrastructure 506 described below with respect to FIG. 5), for example. Similarly, node 120 and/or local ledger 110 may also be within client 140, such as in local storage or modules implemented in hardware, software, or any combination thereof, for example. Node 120 may have at least one corresponding local ledger 110, which may represent a local copy of a distributed ledger, for example. In some embodiments, node 120 may be a blockchain node, for example.

For purposes of this patent disclosure, outputting ciphertext, noise data, or any data, to a node, whether locally or via a network, may be considered to be outputting to an output device. Other examples of output devices may be, for example, a file or stream, including a standard output file or stream; a printer, teletype, terminal, or terminal emulator; an audio modulator, including a text-to-speech (TTS) device; a light-emitting diode (LED), lamp, or other light-signaling device; a radio antenna or other electromagnetic transducer; an electromagnet or other means of generating a magnetic signal; or virtually any other way to convey output of a signal or non-transitory data storage, to name a few non-limiting examples according to some embodiments. Output to at least one output device may involve output to multiple types of output devices such as more than one of the types of output devices listed in this paragraph, for example.

Each of these elements may be modular components implemented in hardware, software, or some combination thereof. Further, in some embodiments, any of these elements may be integrated with client 140. Additionally, in some Internet-of-Things (IoT) embodiments, client 140 may be a portal or other platform, and the elements 150-190 may be implemented locally or remotely, as individual microservices, in a cloud or in specific server(s), or in various combinations as at least one monolithic platform. Thus, client 140 may include a timer module (timing module), noise generator module, cache module, and/or encryptor module (encryption module) in some embodiments having modular architectures, for example.

The input data may originate from practically any source, including user input, machine input, or other automated inputs, including periodic or event-driven inputs. Some non-limiting examples of such automated inputs may include reading sensors, such as environment sensors, periodically or upon threshold values being detected by the sensors; automated log files, in plaintext or encoded (e.g., binary, not necessarily encrypted) formats; other programmatic inputs including application programming interface (API) inputs; etc.

Further, when sending data to node 120, data sent to node 120 may include any ciphertext output that may be stored in cache 170. Additionally or alternatively, data sent to node 120 may include noise generated by noise generator 160. Noise may be random noise having uniform distribution or other predetermined distributions, in some embodiments, and may be based on other environmental input from sensors, for improved entropy. Additionally or alternatively, noise may be pseudorandom noise, which may further satisfy at least one criterion for statistical randomness, in some embodiments, including whether the noise may pass hypothesis tests for frequency distribution, sequences, gaps, etc.

In some embodiments, noise generator 160 may implement a mimic function designed to output noise data that mimics ciphertext output stored in cache 170, but which is not actual ciphertext, and would result in other random data when decrypted with any legitimate key(s) as appropriate. Any decrypted plaintext then may be expected to stand out clearly from any "decrypted" noise that would result from applying a decryption key to the output of the mimic function of noise generator 160.

The mimic function may, in some embodiments, generate noise data based on a statistical model of real ciphertext that as actually generated and/or output by encryptor 180 (or sent to node 120) at some point or during some window of time in the past, e.g., within the last 6 hours, within the last 40 minutes, etc. Additionally or alternatively, the mimic function may be based on a statistical model applied to a certain number of output instances or iterations of encryptor 180 (or instances of real ciphertext sent to node 120), in some embodiments, e.g., the last 20 rounds of encryptor 180 output, the last 10 blocks of real ciphertext written to node 120, etc. The statistical model may be applied to an amount of ciphertext forming at least one representative sample of ciphertext, for example, at a given time, once, periodically, and/or at randomly selected times, according to some non-limiting examples.

Alternatively, noise generator 160 may generate spurious plaintext to be encrypted by encryptor 180 using the same or different encryption key(s). Using different encryption keys, spurious plaintext data encrypted with different encryption keys may be expected to appear random output when a decryption attempt is made with a legitimate key, remaining recognizable as data that a legitimate user may ignore. Even if the encryption of the spurious data uses the same key, then the spurious data may be readable upon decryption. However, the spurious data may be generated in a way that a legitimate intended recipient of the decrypted plaintext data would know to ignore, while an attacker may be deceived or thrown off a cryptanalysis trail by the spurious data if decrypted, in some embodiments. In some other embodiments, spurious plaintext data may be generated by a mimic function, which may be the same as or different from the previously mentioned mimic function, and which may be based on statistical models of plaintext input to encryptor 180, or which may, additionally or alternatively, be based on other models, such as semantic models, syntactic models, or any of various grammatical models, for example.

Timer 150 may generate a timing signal that may indicate when noise generator 160, encryptor 180, and/or cache 170, should send their output to an appropriate element within client 140 and/or ultimately to node 120, in some embodiments. Timer 150 may emit a periodic timing signal to any of the other elements of client 140, in some embodiments. Additionally or alternatively, timing signals output from timer 150 may be varied in a random or pseudorandom manner, or according to predetermined pattern(s), in some embodiments.

For example, in a non-limiting example embodiment, timer 150 may send a timing signal every x seconds (e.g., where x=10) with respect to a system clock, and/or timer 150 may send a timing signal every y seconds (e.g., where y may be a number randomly (or pseudo-randomly) selected between 1 and 120). Additionally or alternatively, timer 150 may send a timing signal every z seconds, where z may represent a number sequentially or randomly chosen, e.g., from the first x elements of a Fibonacci sequence, to name another non-limiting example. Practically any arrangement of timer settings may be possible depending on the specific implementation of client 140 (or corresponding IoT portal, in some embodiments).

In some embodiments, a first timing signal may be output every x seconds, a second timing signal may be output every y seconds, and a third timing signal may be output every z seconds, with x, y, and z defined as described above, for example. Alternatively, in some embodiments, at least one timing signal may be dependent on an amount of real ciphertext or mimic function output generated, instead of or in addition to actual time or any system clock.

Additionally, in some embodiments, there may be a protocol to resolve contention if multiple timing signals coincide at the same time. For example, if, as in the non-limiting example above, x is constant, and y is random, and then both x and y happen to be the same from an initial state, or otherwise coincide after an initial state, timer 150 may be configured to give precedence to the first timing signal (or any of the timing signals predetermined to have precedence), sequentially outputting the first timing signal before the second. Alternatively, depending on implementations of some embodiments, multiple timing signals may be simultaneously output in parallel, with the response to be determined separately with respect to determining whether to output ciphertext or noise data, for example.

When a signal is sent from timer 150 to trigger transmission of data from client 140 to node 120, in some embodiments, client 140 may send ciphertext output (based on real input data without spurious data), noise (generated by noise generator 160, which may include a mimic function), or some combination thereof, in some embodiments. Client 140 may send any other accompanying data necessary for a given transaction on the node 120. Additional logic of client 140, acting in response to timing signals from timer 150, is described further with respect to FIG. 2 below.

Figure 2:
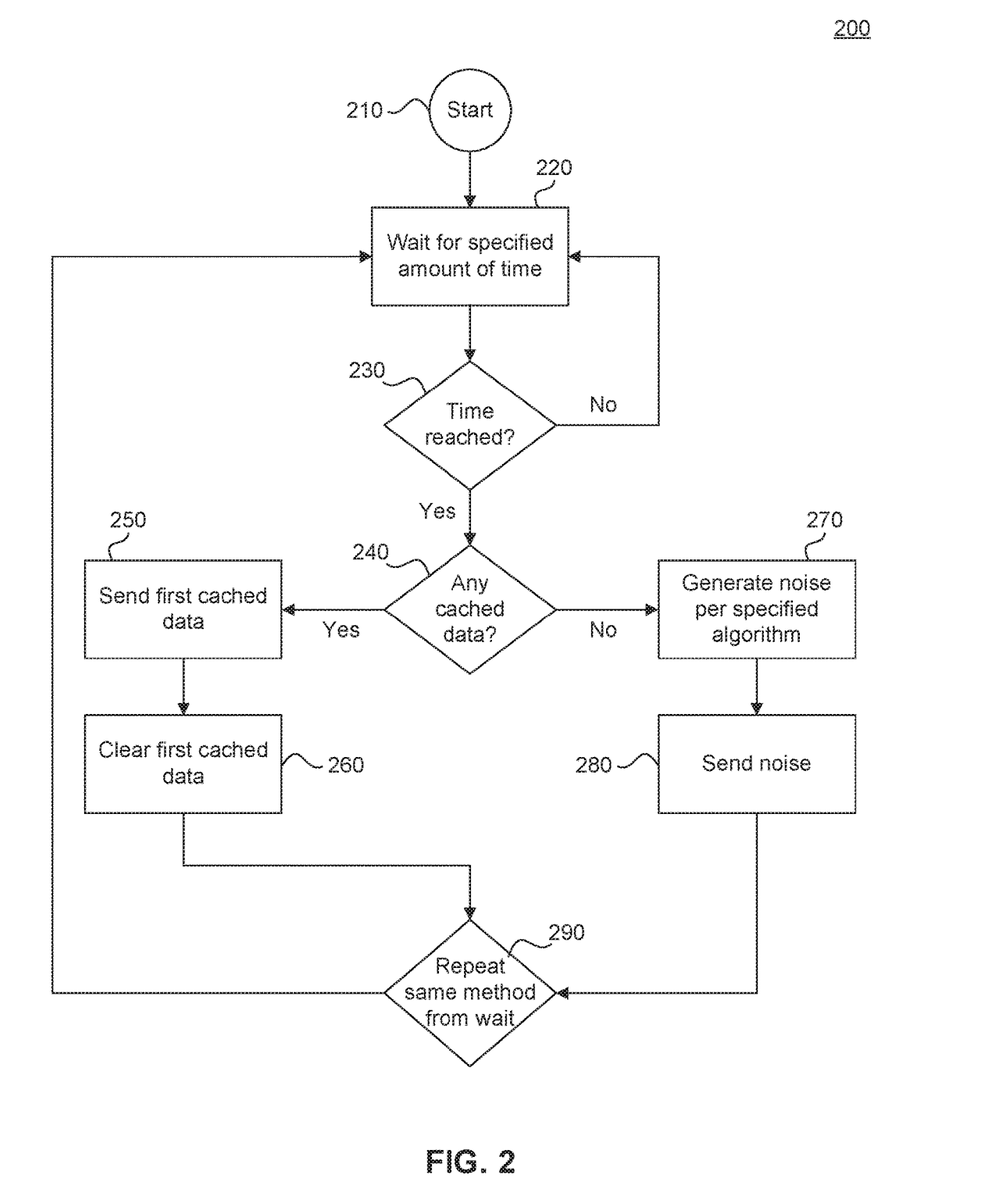
FIG. 2 is a flowchart illustrating a method for introducing noise into a ciphertext signal to be sent to a node for writing to a ledger, according to some embodiments.

FIG. 2 is a flowchart illustrating a method 200 for introducing noise into a ciphertext signal to be sent to a node, such as for writing to a ledger, according to some embodiments. Method 200 may be performed by processing logic that may comprise hardware (e.g., circuitry, dedicated logic, programmable logic, microcode, etc.), software (e.g., instructions executing on a processing device), or a combination thereof. Not all steps of method 200 may be needed in all cases to perform the enhanced encryption techniques disclosed herein. Further, some steps of method 200 may be performed simultaneously, or in a different order from that shown in FIG. 2, as will be understood by a person of ordinary skill in the art.

Method 200 shall be described with reference to FIGS. 1 and 3. However, method 200 is not limited only to those example embodiments. The steps of method 200 may be performed by at least one computer processor coupled to at least one memory device. An exemplary processor and memory device(s) are described below with respect to FIG. 5. In some embodiments, method 200 may be performed by system 100 of FIGS. 1 and 3, which may further include at least one processor and memory such as those of FIG. 5.

At 210, the method may be initialized, executed, or otherwise started if not already being performed. From 210, following any implementation-specific initialization procedures, if any, according to some embodiments, the method may then advance to 220. In some embodiments, this flow of execution may be defined by a finite state machine, procedural programming, object-oriented programming, and/or other logic in hardware, software, or some combination of the above.

At 220, execution may pause or wait for a specified amount of time. As described above with respect to timer 150 of FIG. 1, the specified time may be any of x, y, or z seconds, in one non-limiting example. In some embodiments, the wait time may be on the order of small fractions of a second, or may be considerably longer, in terms of minutes, hours, days, weeks, etc., and may depend on the nature of the transactions to be recorded in local ledger 110 and any distributed ledger and any algorithms for validating consensus, for example.

At 230, a condition may be evaluated to determine whether or not the specified amount of time to wait has elapsed. If this time has not yet been reached, execution may return to waiting until such time has been reached. Once the specified amount of time has been reached, execution may then proceed to 240.

At 240, a condition may be tested or evaluated for whether there is any cached data, such as whether there is any ciphertext output in cache 170, as described above with respect to FIG. 1. In the embodiment of FIG. 2, if there is cached data, then execution may proceed to 250, where at least some of the cached data (labeled "first cached data" for illustrative purposes here) may be sent out, such as to node 120 via network connection 130, or otherwise sent to some other intermediate location or buffer (not shown). Execution may further continue to 260, in which the cached data sent (the "first cached data") may then be cleared from the cache 170, in some embodiments, so as to ensure consistency, track cache data, and/or make room for other cache data, as determined by specific implementation details of some embodiments.

In the event that, at 240, there were no cached data available in cache 170, then execution may proceed to 270, in which noise generator 160 may generate noise (not shown). The noise may be generated per a specified algorithm, e.g., to ensure uniform distribution of noise, colored distribution of noise, targeted distribution of noise (so as to mimic legitimate ciphertext, such as by a mimic function) or per other patterns. Execution may further continue to 280, where the noise may then be sent out, such as to node 120, via network connection 130, or otherwise sent to some other intermediate location or buffer (not shown).

In a non-limiting example according to some embodiments, client 140 may send noise data generated by noise generator 160 upon a determination that the timer 150 has reached a predetermined time (such as x, y, z, etc., as described above). This determination may be made in response to a timing signal (not shown) from timer 150, for example. In some embodiments, a first timing signal may be output every x seconds, a second timing signal may be output every y seconds, and a third timing signal may be output every z seconds, with x, y, and z defined as described above, for example. Alternatively, in some embodiments, at least one timing signal may be dependent on an amount of real ciphertext or mimic function output generated, instead of or in addition to actual time or any system clock.

In some embodiments, in combination with or independent of the example described immediately above, client 140 may send noise data generated by noise generator 160 upon detecting that a pattern of the actual ciphertext (such as that stored in cache 170 or immediately output from encryptor 180) satisfies (or fails to satisfy) at least one criterion for statistical randomness, in some embodiments, including whether properties of the noise may pass hypothesis tests for frequency distribution, sequences, gaps, and so on. Output of the mimic function of noise generator 160 may be adjusted accordingly, following any available algorithm, model, or pattern for the mimic function, for example.

The noise data, in some embodiments, may be a random string that may resemble encrypted data. This similarity between the noise data and actual encrypted data (real ciphertext) may be achieved by a mimic function that may be implemented in a noise generator agent (not shown) of the noise generator 160. If another device may become connected to client 140, a value of the other device may then be read by client 140 at that time (or may be generated on client 140 automatically or manually). This value may then be encrypted by encryptor 180, and may be optionally stored in cache 170, for subsequent transmission to a node such as node 120, or even ultimately to nodes 312 and 314 (see FIG. 3 below), by way of network connections 130, 320, and/or 322 (on public or private networks), for example. At this point, client 140 may further, in some embodiments, be configured to delete some or all of any ciphertext in cache, some or all of the ciphertext that was last transmitted to at least one node, for example.

Following either of 260 or 280, execution may then flow to 290, which may result in repeating the same method from the wait of 220, returning to this part of the flowchart. In some embodiments, execution may also be halted or terminated for various reasons, by a user manually or by an automated computer process or by artificial intelligence (AI), for example. Additionally, depending on how 240 is performed and how the rest of the system 100 is structured, steps 260 and 280 need not be mutually exclusive-noise and cached data may be sent, for example, in adjacent sequence without intervening time gaps, in some embodiments.

Figure 5:
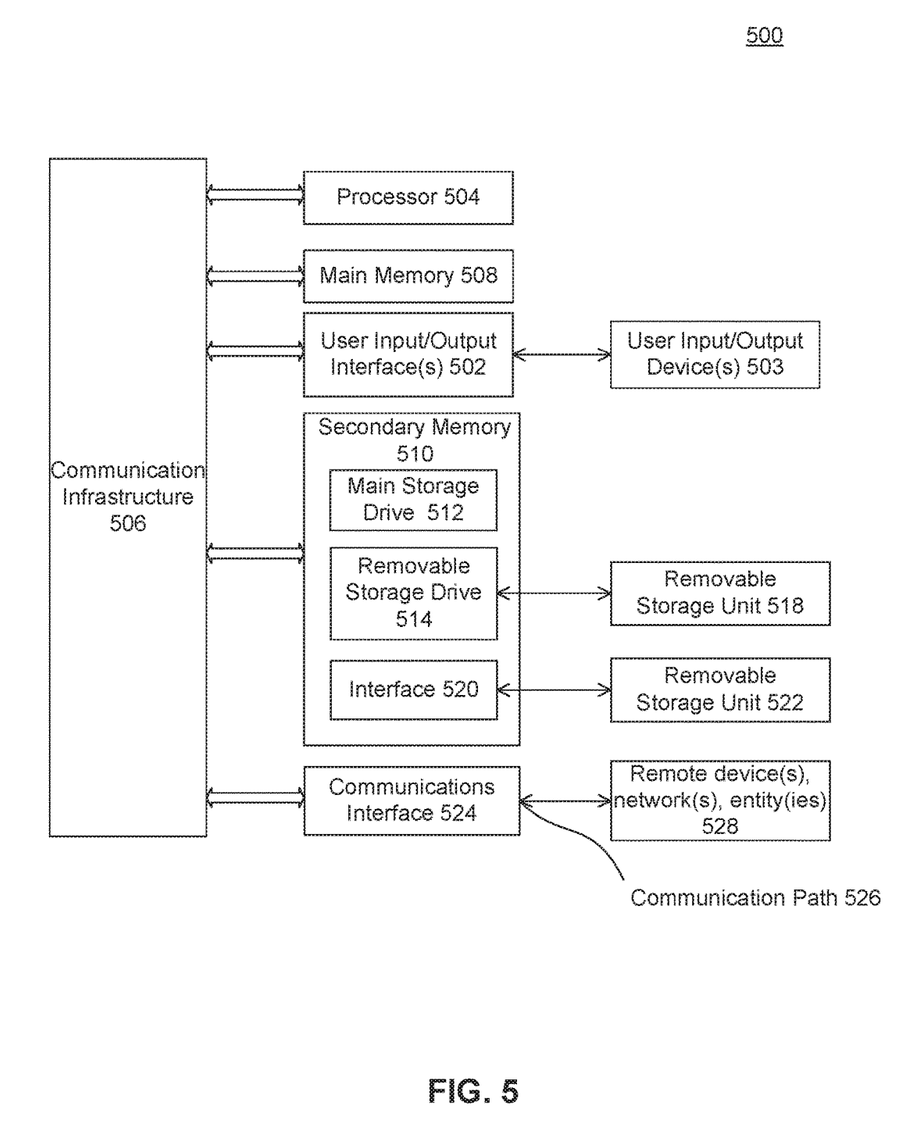
FIG. 5 is an example computer system useful for implementing various embodiments.

Various embodiments may be implemented, for example, using one or more well-known computer systems, such as computer system 500 shown in FIG. 5. Computer system 500 may comprise system 100, and may be used, for example, to implement method 200 of FIG. 2.

Method 200 is disclosed in the order shown above in this exemplary embodiment of FIG. 2. In practice, however, the operations disclosed above, alongside other operations, may be executed sequentially in any order, or they may alternatively be executed concurrently, with more than one operation being performed simultaneously, or any combination of the above.

Implementing the above operations of FIG. 2 may offer at least the following advantages: an attacker may be unable to know when an update (e.g., to a distributed ledger) is genuine (real ciphertext) or is only noise, thus defeating time-based attacks; and because any proportion of the data may in fact be based on random noise specifically filtered or modeled to resemble the real ciphertext, the attacker may not know, or may be unable to determine, which text to attack offline, such as by cryptanalysis or by brute-force decryption, for example. Further, any statistical models (e.g., frequency analysis) of such data may typically return bogus results, further preventing frequency analysis, let alone any decryption. In this way, real ciphertext may also be indistinguishable from the noise data. This therefore achieves stronger encryption more efficiently, without additional processing overhead needed for more conventional methods of encryption (e.g., using very long keys, memory-intensive encryption algorithms, other computationally expensive or rotating encryption algorithms, etc.), and without needing more complex implementations of stochastic randomization of keys and/or algorithms, although any of the above techniques and many other existing, advanced, or post-quantum cryptographic methodologies would still be compatible with the enhanced encryption techniques disclosed herein, for further added security.

Figure 3:
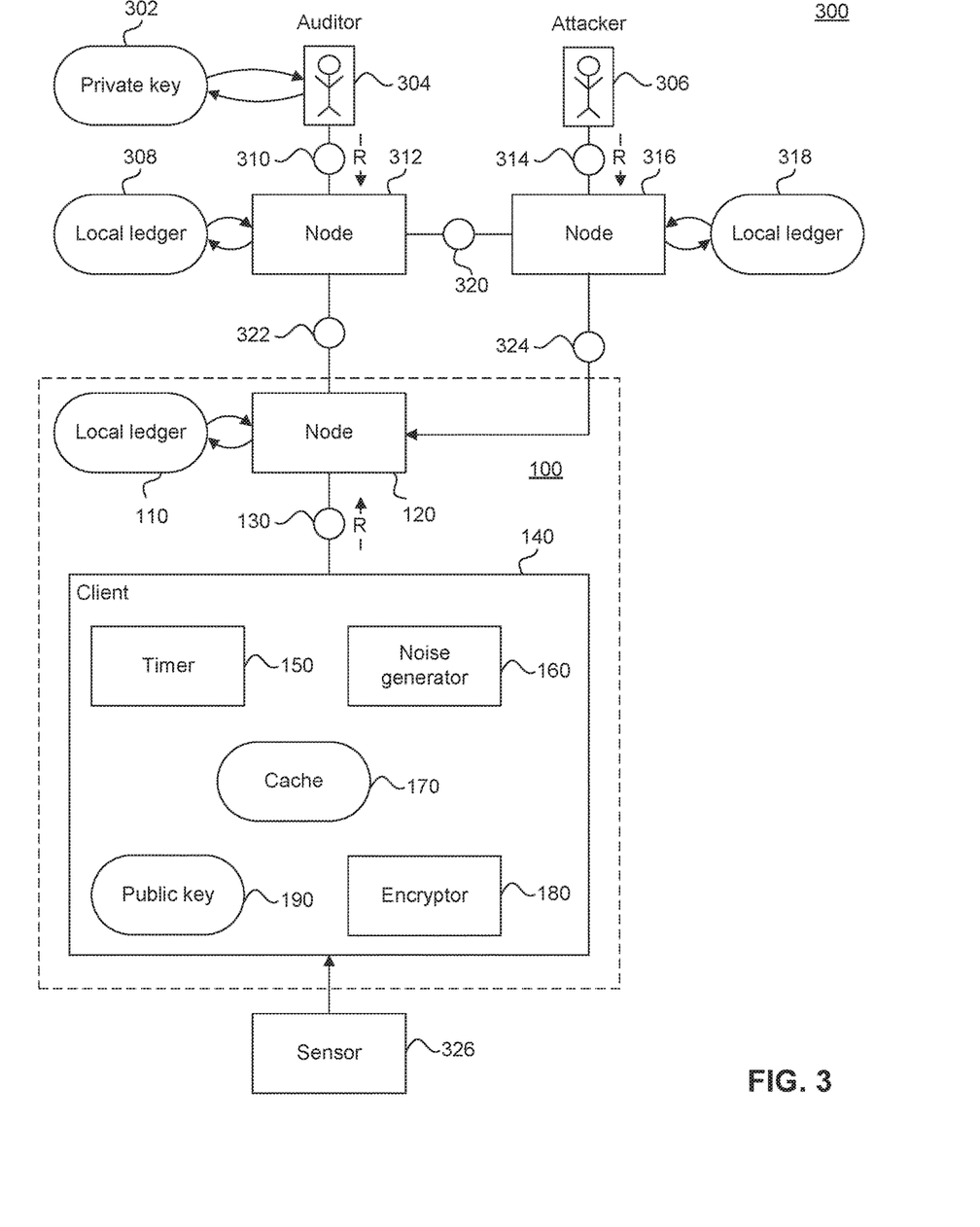
FIG. 3 is an expanded block diagram showing system 100 in a larger context, according to some embodiments, further depicting a subset of at least one global network 300 of distributed ledgers.

FIG. 3 is an expanded block diagram showing system 100 in a larger context, according to some embodiments, further depicting a subset of at least one global network 300 of at least one distributed ledger having multiple local copies, at least one per node. System 100, as similarly shown in FIG. 1, is depicted here within the rectangular box delimited by a broken line. This broken line is for illustrative purposes only, to highlight that the contents are the same (in this example) as those of system 100 of FIG. 1; the broken line does not represent any actual (physical or logical) barrier in network 300.

As previously described with respect to some elements, 130, 310, 314, 320, 322, and 324 represent network connections, which may be on public or private networks, in some examples. There may be multiple nodes of a distributed ledger, such as nodes 120, 312, and 316, for example. Each of these nodes may have a corresponding local ledger, such as local ledgers 110, 308, and 318, respectively. In order to decrypt ciphertext in any of the corresponding local ledgers from any node in the distributed ledger, a decryption key, such as private key 302, may be shared with an auditor 304, who may be any authorized party with rights to view the decrypted plaintext of ciphertext data legitimately. In some embodiments, the decryption key may be a public key, at least part of a consortium key set, or multiple keys in various combinations, for example. Attacker 306 may be any party seeking to defeat encryption of encrypted communications in the distributed ledger. Attacker 306 may receive ciphertext from any up-to-date node in the distributed ledger, in this case node 316. However, in other non-limiting examples, attacker 306 may attack any node in the distributed ledger, including 120, 312, or any other node not shown here.

From this perspective of a global network such as network 300, auditor 304 (or any other authorized party) may still be able to find and retrieve transactions from any node's respective local ledger copy. If auditor 304 decrypts this copy using an authorized private key 302 of client 140, auditor 304 may then decrypt any or all of the real ciphertext present in the local ledger 308 of node 312 (or any other corresponding copies of similar nodes), while the noise data may still show up then as similar noise after output from applying the same decryption key. In some embodiments, it may be assumed that the resultant plaintext output would be easily distinguishable and readily recognizable from other noise, even if the corresponding ciphertext looks similar to the noise data generated from the mimic function.

Despite this ease of access by auditor 304 and/or any other authorized party, attacker 306 on the other hand may instead be unable to perform ciphertext attacks (including any meaningful frequency analysis or other successful cryptanalysis) on its local ledger 318 copy that is present in node 316 (or any other node in the corresponding distributed ledger). If the non-plaintext entries in a distributed ledger or chain of transactions thereon look effectively the same in their "random" or "encrypted" state, whether or not they contain actual encrypted plaintext as real ciphertext, the likelihood of success of a brute-force attack on any real ciphertext in any corresponding public ledger may thus be significantly reduced. This reduction of the ciphertext attack surface, while maintaining consistency and ease of use for legitimate interested parties, therefore may solve the problems identified above in the Background section above, thereby ensuring at least an acceptable level of confidentiality for new users of public distributed ledger technology, such as blockchain technology, to name some non-limiting examples.

To describe one non-limiting scenario where FIG. 3 may depict a real-world use case involving Internet-of-Things (IoT) devices and blockchain technology, client 140 here may be an embedded platform with an IoT configuration as would be understood by a person of ordinary skill in the art. In this non-limiting example, node 120 may be a blockchain node. Sensor 326 may be, in this example, at least one temperature sensor inside a refrigerator, freezer, cooler, or other refrigeration apparatus.

Continuing with the same non-limiting example scenario, freight trains, trucks, warehouses, grocery stores, convenience stores, etc., may be equipped with portals through which containers of perishable goods may be required to pass. Such containers and portals may be equipped with the IoT devices described in the preceding paragraph, as well as identifiers and/or equipment to read such identifiers, including but not limited to barcodes, matrix codes, near-field communication (NFC) identifiers, radio frequency identifier (RFID) tags, etc.

When such identifiers are processed and/or recorded as passing through any given portal, information from sensor 326, including temperature information from the at least one temperature sensor in a given container, may then be recorded in a distributed ledger, including a blockchain. The temperature information may include current temperature of the given container at the portal, as well as a maximum temperature that the sensor had registered in transit with the current contents of the given container. There may also be timestamps and location data for the portals, for example. On a blockchain, all of this information stored is therefore permanently and immutably stored, tamperproof.

If the contents of the container were perishable food or drug items, such as ice cream, delicate medications or vaccines, live viruses or biological specimens, etc., such sensor information would prove useful in determining whether the refrigeration apparatus of the container may have malfunctioned in transit and/or whether the contents of the container may have spoiled or otherwise been damaged. No party could alter this information on the blockchain.

At the same time, this information may be highly sensitive and confidential. If there were spoilage, this information could be helpful to legitimate interested parties to the extent that they could prevent damaged goods from being delivered. At the same time, if competitors, third-party attackers, or other malicious parties were to obtain such information, these other parties could use such information to their advantage, such as to learn of the legitimate parties' shipment routes and contents, as well as failure rates of transportation or refrigeration equipment, identifications of damaged goods, etc. Such information may further be used to harm the interests of the legitimate interested parties in other ways.

To prevent against such harm, the enhanced encryption techniques disclosed herein may mitigate such attacks and leaks to competitors, third-parties, and malicious attackers, even in scenarios where blockchain technology is used. Although blockchain records may be permanent and immutable, thus tamperproof, blockchains are also publicly distributed and downloadable, enabling powerful offline attacks on ciphertext that may be used in blockchain records, thus making it easier for malicious parties to crack encryption and obtain the sensitive and/or confidential encrypted information stored on the blockchain. However, employing the enhanced encryption techniques disclosed and described herein may considerably mitigate even these such offline attacks on publicly accessible ciphertext.

Figure 4:
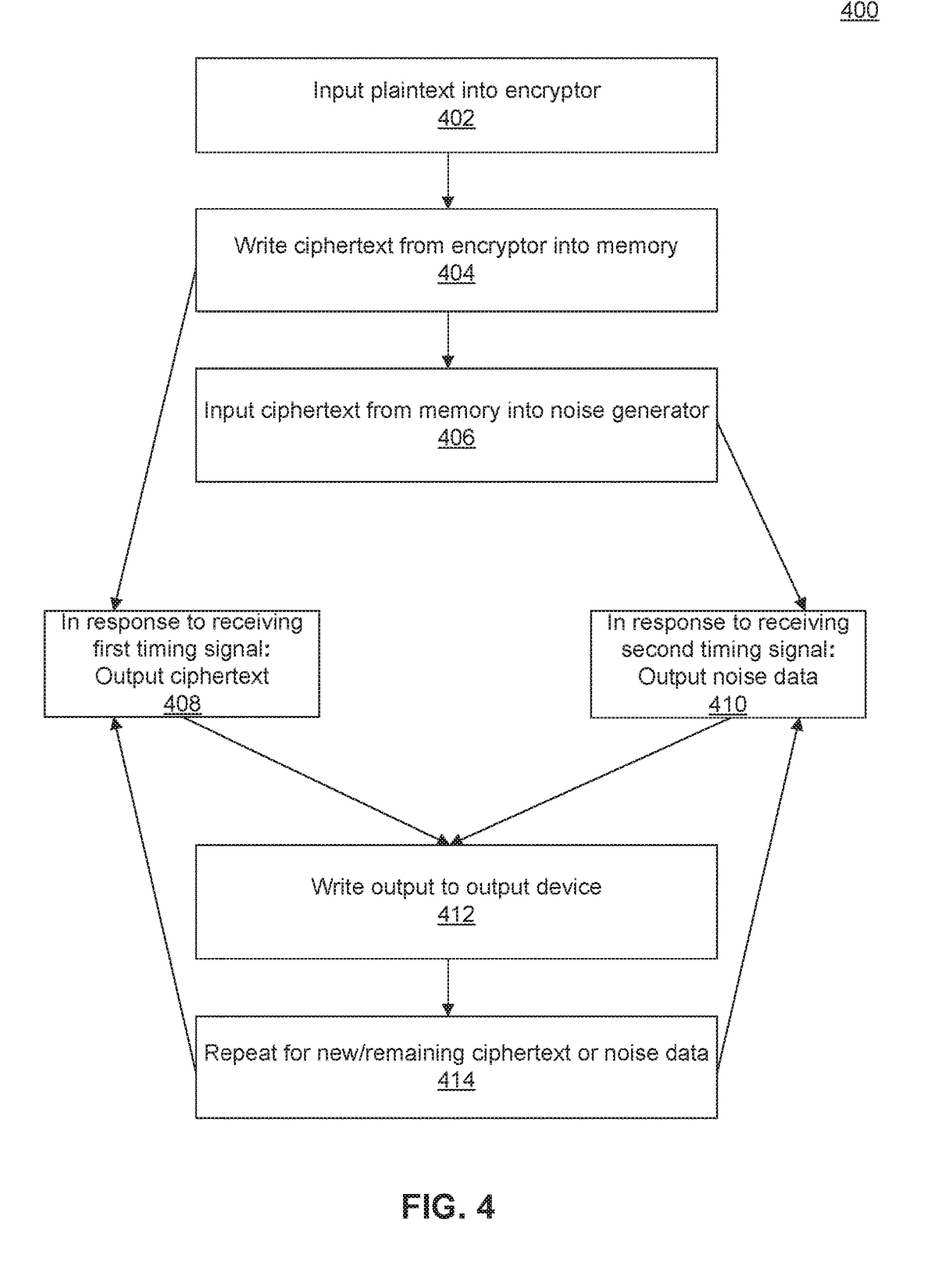
FIG. 4 is a flowchart illustrating a method for operation of enhanced encryption techniques, according to some embodiments.

FIG. 4 is a flowchart illustrating a method 400 for operation of enhanced encryption techniques, according to some embodiments. Method 400 may be performed by processing logic that may comprise hardware (e.g., circuitry, dedicated logic, programmable logic, microcode, etc.), software (e.g., instructions executing on a processing device), or a combination thereof. Not all steps of method 400 may be needed in all cases to perform the enhanced encryption techniques disclosed herein. Further, some steps of method 400 may be performed simultaneously, or in a different order from that shown in FIG. 4, as will be understood by a person of ordinary skill in the art.

Method 400 shall be described with reference to FIGS. 1, 3, and 5. However, method 400 is not limited only to those example embodiments. The steps of method 400 may be performed by at least one computer processor coupled to at least one memory device. An exemplary processor and memory device(s) are described below with respect to FIG. 5. In some embodiments, method 400 may be performed by system 100 of FIGS. 1 and 3, which may further include at least one processor and memory such as those of FIG. 5.

In 402, at least one processor 504 may be configured to input plaintext into an encryptor, such as encryptor 180 of FIGS. 1 and 3. Plaintext may originate from sensors, as described above, automated or event-driven input, manual input from a user, or practically any other source of plaintext input as would be understood by a person of ordinary skill in the art. Some non-limiting examples of such automated inputs may include reading sensors such as sensor 326, which may be, according to some embodiments, environment sensors, polled periodically or upon threshold values being detected by the sensors; automated log files, in plaintext or encoded (e.g., binary, not necessarily encrypted) formats; other programmatic inputs including application programming interface (API) inputs; etc.

In 404, processor 504 may be configured to write ciphertext, such as output from encryptor 180, into memory. For purposes of 404, the memory may be any kind of memory, including cache 170, main memory 508, and/or secondary memory 510, including main storage drive 512 or any removable storage drive 514 or external removable storage unit(s) 518, 522, etc.

In 406, processor 504 may be configured to input the ciphertext from the memory (such as that into which the ciphertext was stored in 404, or any other intermediate memory to which the same ciphertext may have been transferred in the meantime) into a noise generator, such as noise generator 160. The noise generator into which the ciphertext is input in 406 may be configured to employ at least one mimic function as described above with respect to noise generator 160.

In 408, when a first timing signal is received, ciphertext may be output, such as from client 140 to an external (outside-facing) interface, or to another element within client 140, in some embodiments. The first timing signal may be received from a timer such as timer 150. Timing signals, including the first timing signal, may be generated by the timer in ways similar to those described above with respect to timer 150. The ciphertext output in 408 may originate from the memory into which the ciphertext was stored in 404, in some embodiments. Additionally or alternatively, according to some embodiments, the ciphertext output in 408 may originate directly from an output of the encryptor, such as encryptor 180, with or without being buffered in any other memory such as cache 170, main memory 508, and/or secondary memory 510, etc.

In 410, when a second timing signal is received, noise data may be output, such as from client 140 to an external (outside-facing) interface, or to another element within client 140, in some embodiments. The second timing signal may be received from a timer such as timer 150. Timing signals, including the second timing signal, may be generated by the timer in ways similar to those described above with respect to timer 150. Noise data output in 410 may originate directly from an output of the noise generator, such as noise generator 160, with or without being buffered in any other memory such as cache 170, main memory 508, and/or secondary memory 510, etc.

In 412, output generated in either of 408 or 410 (or both) as described immediately above may be written to at least one output device by processor 504. For example, an output device may be at least one of a file or stream, including a standard output file or stream; a printer, teletype, terminal, or terminal emulator; an audio modulator, including a text-to-speech (TTS) device; a light-emitting diode (LED), lamp, or other light-signaling device; a radio antenna or other electromagnetic transducer; an electromagnet or other means of generating a magnetic signal, or virtually any other way to convey output of a signal or non-transitory data storage, to name a few non-limiting examples according to some embodiments. Output to at least one output device may involve output to multiple types of output devices such as more than one of the types of output devices listed in this paragraph, according to some embodiments.

In 414, operations such as 408 and/or 410 may be repeated for any new or remaining ciphertext or noise data available and not yet written to the output device(s) when another instance of the first or second timing signals may be received. In any event, even if no new ciphertext is available, new noise data may be generated based at least on old real ciphertext, and further noise data may be output again in response to such later instance(s) of the second timing signal, according to some embodiments.

Various embodiments may be implemented, for example, using one or more well-known computer systems, such as computer system 500 shown in FIG. 5. Computer system 500 may comprise system 100, and may be used, for example, to implement method 400 of FIG. 4.

Method 400 is disclosed in the order shown above in this exemplary embodiment of FIG. 4. In practice, however, the operations disclosed above, alongside other operations, may be executed sequentially in any order, or they may alternatively be executed concurrently, with more than one operation being performed simultaneously, or any combination of the above.

Implementing the above operations of FIG. 4 may offer at least the following advantages: an attacker may be unable to know when an update (e.g., to a distributed ledger) is genuine (real ciphertext) or is only noise, thus defeating time-based attacks; and because any proportion of the data may in fact be based on random noise specifically filtered or modeled to resemble the real ciphertext, the attacker may not know, or may be unable to determine, which text to attack offline, such as by cryptanalysis or by brute-force decryption, for example. Further, any statistical models (e.g., frequency analysis) of such data may typically return bogus results, further preventing frequency analysis, let alone any decryption. In this way, real ciphertext may also be indistinguishable from the noise data. This therefore achieves stronger encryption more efficiently, without additional processing overhead needed for more conventional methods of encryption (e.g., using very long keys, memory-intensive encryption algorithms, other computationally expensive or rotating encryption algorithms, etc.), and without needing more complex implementations of stochastic randomization of keys and/or algorithms, although any of the above techniques and many other existing, advanced, or post-quantum cryptographic methodologies would still be compatible with the enhanced encryption techniques disclosed herein, for further added security.

A skilled artisan would further appreciate that the concepts disclosed above address another core issue with respect to public ledgers such as decentralized or distributed ledgers, in that a public ledger allows attackers to get a copy of the ledger, effectively providing any motivated attacker with a valuable "data dump," removing any steps that an attacker would have needed to take simply to get access to sensitive ciphertext. However, the methods herein may not be sufficient to guard against, for example, a leak in security of the auditor or originator of the plaintext, such as if any sensitive keys or plaintext were leaked or compromised via other channels, for example.

Thus, if auditor 304 had private key 302 fall into the wrong hands, then any attacker who has the same key as the trusted, authorized parties (such as auditor 304) may then be able to read any message encrypted using the same encryption key on other ledger entries, other ledgers, or any other place where such ciphertext may be available (including traditional data dumps of existing security compromises). But these weaknesses and similar issues stem from fundamental security practices in general, not specifically related to the particular enhancements to certain encryption techniques described herein.

Further improvements, therefore, may include at least one of the following, or some combination thereof: using a mimic function at a string level to make strings have like or similar properties from a cryptanalysis perspective, applying the same mimic function at a level of a message or other periodic communication, and/or actually encrypting at least some false or spurious data with at least one different encryption key, and including in the false or spurious data at least some random noise or known false data ("red herring" or decoy data).

Additionally, intermixing known false data encrypted with another key may carry a further added benefit that, even in a rare case in which an attacker may actually manage to decrypt some data, the attacker then may still be unsure that this dataset was a real dataset, as the attacker may be deceived by bogus data, or the attacker may also then need to decrypt all assets in order to analyze all content and possibly need to decide which version(s) to trust. Similarly, known false data, potentially alongside the added keys with the false data, thus may add an element of plausible deniability in an event that some amount of real data may be publicly leaked or cracked and exposed at least in part. Any combined implementation of multiple features of the features listed here may thus result in further improvements to the intended effects of the encryption techniques newly described in this specification.

In some embodiments, implementing the enhanced encryption techniques disclosed herein, alongside strong general security practices, may enhance performance and efficacy of encryption in systems that rely on making sensitive information publicly available as ciphertext.

This improvement, in turn, may further bolster confidence in would-be adopters of technology that may put private information in the public sphere, including distributed ledger and blockchain technology, to name some non-limiting examples. In cases of blockchain technology, such added security would further allow users to leverage other security benefits of shared or distributed public ledgers, such as their resistance to tampering (e.g., forgery, intentional deletion or destruction, etc.) and the overall persistence and immutability of distributed ledger technology.

Using techniques such as those described above, communications and stored data may achieve extra security. Even in cases where perfect forward secrecy or similar protections are not feasible (even such as for contractual obligations, regulatory requirements, or similar non-technical reasons), long-term security and integrity of user data may be significantly improved.

Another specific advantage of the techniques described herein is that frequency analysis of ciphertext elements may be rendered ineffective in large part if not completely. Other common or related cryptanalysis techniques, such as coincidence counting, time-based attacks, or length-based attacks, may similarly be ineffective or useless against the techniques described herein. Further specific advantages, which may further derive from thwarting common cryptanalysis mentioned here, include slowing down, materially hindering, and/or completely preventing brute-force attacks or other common plaintext attacks or ciphertext attacks for obtaining target plaintext and/or for deriving keys used for encryption.

As with any other encryption method that may be effectively unbreakable, in theory or in practice, users may still be vulnerable to social engineering, information leakage, and side-channel attacks in a given implementation. These secondary weaknesses may be mitigated by educating users about these threats and best practices for their mitigation, as well as careful design and testing by implementers, with independent auditing for side-channel vulnerabilities. Assuming that any universal shortcomings such as these are considered and appropriately mitigated to the extent feasible in any given implementation and in actual use, the encryption techniques described herein may prove highly effective at maintaining security and integrity of user information, including in public settings.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a bus or communication infrastructure 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example.

Additionally, one or more of processors 504 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or secondary memory 510. Secondary memory 510 may include, for example, a main storage drive 512 and/or a removable storage device or drive 514. Main storage drive 512 may be a hard disk drive or solid-state drive, for example. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communication path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

It should be appreciated that the framework described herein may be implemented as a method, process, apparatus, system, or article of manufacture such as a non-transitory computer-readable medium or device. For illustration purposes, the present framework may be described in the context of distributed ledgers being publicly available, or at least available to untrusted third parties. One example as a modern use case is with blockchain-based systems. It should be appreciated, however, that the present framework may also be applied in other settings where sensitive or confidential information may need to pass by or through hands of untrusted third parties, and that this technology is in no way limited to distributed ledgers or blockchain uses.

Computer system 500 may be a client or server, accessing or hosting any applications and/or data through any delivery paradigm, including but not limited to remote or distributed cloud computing solutions, local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, VS, Knockout, jQuery, Dojo, Dijit, OpenUI5, AngularJS, Express.js, Backbone.js, Ember.js, DHTMLX, Vue, React, Electron, and so on, among many other non-limiting examples.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different from those described herein.

References herein to "one embodiment," "an embodiment," "an example embodiment," "some embodiments," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system, comprising:
   a memory;
   an encryptor module configured to output ciphertext based on plaintext input;
   a timer module configured to output at least a first timing signal and a second timing signal;
   a noise generator module configured to generate noise data in accordance with a mimic function, wherein the mimic function is configured to mimic the ciphertext output by the encryptor module; and
   at least one processor coupled to the memory and configured to:
      input the plaintext into the encryptor module;
      write the ciphertext output from the encryptor module into the memory;
      input the ciphertext from the memory into the noise generator module;
      in response to receiving the first timing signal from the timer module, output the ciphertext from the memory to at least one output device; and
      in response to receiving the second timing signal from the timer module, output the noise data generated by the noise generator module to the at least one output device.

2. The system of claim 1, wherein to output the ciphertext and to output the noise data, the at least one processor is further configured to:
   in response to the receiving the first timing signal from the timer module, write the ciphertext to a node of a distributed ledger; and
   in response to the receiving the second timing signal from the timer module, write the noise data to the node of the distributed ledger.

3. The system of claim 2, wherein the distributed ledger comprises a blockchain.

4. The system of claim 1, wherein the encryptor module is configured to generate the ciphertext based on at least one of a public key and a private key.

5. The system of claim 4, wherein the encryptor module is further configured to implement at least one hybrid cryptosystem.

6. The system of claim 1, wherein to mimic the ciphertext output by the encryptor module, the mimic function is further configured to apply at least one statistical model to at least one sample of the ciphertext output by the encryptor module.

7. The system of claim 1, wherein to mimic the ciphertext output by the encryptor module, the mimic function is further configured to generate spurious plaintext for input into the encryptor module.

8. A computer-implemented method for strengthening encryption, comprising:
   inputting, by at least one processor, plaintext into an encryptor;
   writing, by the at least one processor, ciphertext output from the encryptor into a memory;
   inputting, by the at least one processor, the ciphertext from the memory into a noise generator;
   in response to receiving a first timing signal from a timer, outputting, by the at least one processor, the ciphertext from the memory to at least one output device; and
   in response to receiving a second timing signal from the timer, outputting, by the at least one processor, noise data generated by the noise generator to the at least one output device,
   wherein at least one of the inputting the plaintext, writing the ciphertext, inputting the ciphertext, outputting the ciphertext, and outputting the noise data is performed by one or more computers.

9. The computer-implemented method of claim 8, wherein:
   the outputting the ciphertext further comprises, in response to the receiving the first timing signal from the timer, writing, by the at least one processor, the ciphertext to a node of a distributed ledger; and
   the outputting the noise data further comprises, in response to the receiving the second timing signal from the timer, writing, by the at least one processor, the noise data to the node of the distributed ledger.

10. The computer-implemented method of claim 9, wherein the distributed ledger comprises a blockchain.

11. The compute-implemented method of claim 8, wherein the encryptor is configured to generate the ciphertext based on at least one of a public key and a private key.

12. The computer-implemented method of claim 11, wherein the encryptor is further configured to implement at least one hybrid cryptosystem.

13. The computer-implemented method of claim 8, wherein to output the noise data, the noise generator comprises a mimic function configured to mimic the ciphertext output by the encryptor, wherein the mimic function is further configured to apply, by the at least one processor, at least one statistical model to at least one sample of the ciphertext output by the encryptor.

14. The method of claim 13, wherein to mimic the ciphertext output by the encryptor, the mimic function is further configured to generate, by the at least one processor, spurious plaintext for input into the encryptor.

15. A non-transitory computer-readable device having instructions stored thereon that, when executed by at least one computing device, cause the at least one computing device to perform operations comprising:

inputting plaintext into an encryptor module;

writing ciphertext output from the encryptor module into a memory;

inputting the ciphertext from the memory into a noise generator module;

in response to receiving a first timing signal from a timer module, outputting the ciphertext from the memory to at least one output device; and in response to receiving a second timing signal from the timer module, outputting noise data generated by the noise generator module to the at least one output device.

16. The non-transitory computer-readable device of claim 15, wherein:

the outputting the ciphertext further comprises, in response to the receiving the first timing signal from the timer module, writing the ciphertext to a node of a distributed ledger; and the outputting the noise data further comprises, in response to the receiving the second timing signal from the timer module, writing the noise data to the node of the distributed ledger.

17. The non-transitory computer-readable device of claim 16, wherein the distributed ledger comprises a blockchain.

18. The non-transitory computer-readable device of claim 15, wherein the encryptor module is configured to generate the ciphertext based on at least one of a public key and a private key.

19. The non-transitory computer-readable device of claim 15, wherein to output the noise data, the noise generator comprises a mimic function configured to mimic the ciphertext output by the encryptor module, wherein the mimic function is further configured to apply at least one statistical model to at least one sample of the ciphertext output by the encryptor module.

20. The non-transitory computer-readable device of claim 19, wherein to mimic the ciphertext output by the encryptor module, the mimic function is further configured to generate spurious plaintext for input into the encryptor module.

* * * * *